United States Patent [19]
Suarez et al.

[11] 3,899,592

[45] Aug. 12, 1975

[54] SWEETENING AGENT

[75] Inventors: Tulio Suarez; Edmund C. Kornfeld; Jack M. Sheneman, all of Indianapolis, Ind.

[73] Assignee: Eli Lilly and Company, Indianapolis, Ind.

[22] Filed: Jan. 31, 1972

[21] Appl. No.: 222,373

Related U.S. Application Data

[63] Continuation of Ser. No. 719,730, April 8, 1968, abandoned.

[52] U.S. Cl. .................. 426/2; 426/212; 426/217; 426/221; 424/274
[51] Int. Cl. ............................................. A23l 1/26
[58] Field of Search................ 99/140, 141, 141 A; 260/326.14; 424/274

[56] References Cited
OTHER PUBLICATIONS

Rasmussen et al. (I) Bact. Proc., 93–94 (1951).
Gershoff et al. 81 Proc. Soc. Exptl. Biol. Med. 484–486 (1952).
Rasmussen et al. (II) 84 Proc. Soc. Exptl. Med. 306–308 1953.

*Primary Examiner*—Raymond N. Jones
*Attorney, Agent, or Firm*—Kathleen R. S. Page; Everet F. Smith

[57] ABSTRACT

Dextro enantiomorph of certain 6-substituted tryptophane compounds employed as non-nutritive sweetener.

33 Claims, No Drawings

SWEETENING AGENT

CROSS-REFERENCE TO RELATED APPLICATION

This is a continuation of our copending application, Ser. No. 719,730, filed Apr. 8, 1968 and abandoned after the filing of the present application.

BACKGROUND OF THE INVENTION

Numerous substances have been proposed and/or used as non-nutritive sweetening agents, affording the consumer ingesting the same a sense of sweetness at least desirably comparable to that obtained with natural sugar, but without caloric effect. Such substances are necessary for some persons in order to limit intake of the natural sugars and thereby to control various health conditions, including diabetes. Many of these substances, however, have severe disadvantages. The most frequently encountered disadvantages are a bitter aftertaste and toxic side effects at rates not substantially different from those at which the sweetening effect is obtained. Only two classes of non-nutritive sweetening substances are used to any extent: saccharin-type compounds and cyclamate-type compounds. Both classes have the typical disadvantage of a bitter aftertaste; and in addition, cyclamatetype compounds have only limited activity.

Among the various categories of chemicals which have been evaluated for sweeting effect are the amino acids. A recent publication, Vuataz et al., Experientia, Vol. XXI, pages 692–694, inclusive (1965), reports the evaluation of a number of amino acids, the ementiomorphs being evaluated separately where available. The report shows that while a number of amino acids are sweet in the D form, this is not an absolute correlation. Furthermore, despite the sweet taste of the D-enantiomorph of a given amino acid, the L-enantiomorph of the same amino acid may be bitter. Resolution of the two enantiomorphs of a given amino acid is often difficult. For these various reasons, despite the contribution of Vuataz et al., no amino acid is being used in the sweetening art.

Moreover, throughout the sweetening art, it is well known that there is no correlation between structure and activity, as even relatively small changes in chemical structure often destroy activity.

SUMMARY OF THE INVENTION

It has now been discovered that certain substituted tryptophane compounds, in their $d$ form, exhibit a sweet taste of a marked degree, at rates below rates at which any undesirable side effect may be noted.

Hence, the present invention is directed to the use of an active agent which is the $d$-enantiomorph of a substituted tryptophane compound of the formula

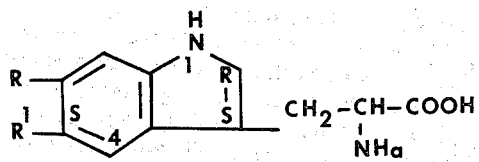

or its non-toxic physiologically acceptable salts, wherein R represents halo of an atomic weight of less than 85, lower alkyl, lower alkoxy, or trifluoromethyl; and R being trifluoromethyl, R' represents hydrogen, or R being halo as defined, lower alkyl, or lower alkoxy, R' represents hydrogen, halo of an atomic weight of less than 85, lower alkyl or lower alkoxy. In the present specification and claims, the terms "lower alkyl" and lower alkoxy are employed to designate alkyl and alkoxy radicals being of from 1 to 4, both inclusive, carbon atoms. Preferred alkyl and alkoxy radicals are methyl and methoxy.

DETAILED DESCRIPTION OF THE INVENTION

The reason for the markedly superior sweetening activity of the compounds to be employed in accordance with the present invention is not known. While trytophane is one of the amino acids evaluated by Vuataz et al., there is no suggestion or teaching of any substituted tryptophane, nor of the superior sweetening activity exhibited by the present substituted tryptophane compounds. Moreover, unlike tryptophane, the activity of the present compounds in the $d$ form is evidenced at such low rates that the $dl$ mixture can be used; therefore, the oftentimes difficult job of resolution is unnecessary.

The compounds to be employed in accordance with the present invention are typically crystalline solid materials. The solubility of the compounds varies. Those which are salts, either alkaline or acid addition, are generally of moderate solubility in water, and of lesser solubility in organic solvents, whereas those which are not salts are of only low to moderate solubility in water, but of higher solubility in organic solvents. As water solubility is desirable in the typical usage of a substance as a sweeting agent, the salts are generally preferred, especially for applications wherein the active agent is to be present in higher concentrations.

However, the type or identity of salt is not critical except that it be non-toxic and physiologically acceptable. Suitable alkaline salts are the ammonium, sodium, potassium, calcium and magnesium salts. Of these, the sodium and calcium salts are preferred. Acid salt formation occurs at the amino nitrogen atom, the ring nitrogen atom being only weakly basic. The identity of the acidic salt forming moiety is not critical, although it is necessary that the acid be a strong acid, that is, an acid having a pH of, numerically, below about 2, at a concentration of 0.1N. Suitable strong acids are hydrochloric, hydrobromic, hydriodic, sulfuric and the like.

The free amino compounds of the present invention are either known in the art or can be prepared readily by employing art-recognized procedure. Thus, for example, one method of obtaining a desired substitued tryptophane employs the corresponding substituted indole as a starting material. The indole is caused to undergo a typical Mannich reaction with formaldehyde and diethylamine and the resulting substituted 3-(diethylaminomethyl)indole is then condensed with diethyl formamidomalonate according to the general procedure of Rydon et al., J. Chem. Soc., 1955, 3499, to form the corresponding diethyl (3-indolymethyl)formamidomalonate. Hydrolysis and decarboxylation of the foregoing intermediate produces the desired substituted trytophane.

An alternate method for the preparation of the substituted tryptophanes employs an appropriately substituted phenylhydrazine, rather than the corresponding indole, as the starting material. The phenylhydrazine is condensed with the adduct of acrolein and acetamidomalonic ester described by Moe et al., J. Am. Chem. Soc., 70, 2765 (1948). Hydrolysis and decarboxylation affords the desired substituted tryptophane.

Suitably substituted indoles and phenylhydrazines which serve as intermediates in the foregoing syntheses are likewise prepared by methods known in the art. The indoles can be prepared either from the appropriately substituted o-nitrotoluenes, by the method of Rydon et al., J. Chem. Soc., 1955, 3499, or by cyclization of suitably substituted phenylhydrazines. The latter can be prepared by the general procedure of Bullock et al., J. Am. Chem. Soc., 78, 5854 (1956).

The compounds obtained as described hereinabove can thereafter be reacted further to obtain corresponding salt. In such further reactions, the desired compounds is reacted with a stoichiometric amount of either a base or acid to procure the corresponding salt. These reactions are of a type well known in the art, and the particular reactions to prepare the present salts are carried out in accordance with procedures well known in the art for this type of reaction. Thus, all of the substances to be employed in accordance with the present invention are prepared as described hereinabove.

As noted above, resolution of the compounds serving as active agent in accordance with the present invention is not necessary, the racemic mixture itself being quite active. However, since the d-enantiomorph is the active moiety, resolution may be preferred to lessen the amount of substance needed for the desired sweetening effect. Moreover, due to the fact that typically only the l-enantiomorph of amino acids is metabolized by the mammalian body, usage of the d-enantiomorph alone, may be preferred to preclude any opportunity for the mammalian body to incorporate the substance.

When, for these or any other reason, it is desired to employ only the d-enantiomorph, resolution of the reacemic mixture can be achieved in procedures known in the prior art for the resolution of unsubstituted tryptophane. Three such procedures are discussed and exemplified in detail in Chemistry of the Amino Acids, Greenstein et al., Vol. 3, page 2341 and following (John Wiley and Sons, Inc., New York, 1961), particular attention is directed to the first two of these (illustrative procedure 39–5 and illustrative procedure 39–6).

Representative compounds to be employed as active agent in accordance with the present invention include the following:

6-chlorotryptophane
6-(trifluoromethyl)tryptophane
6-bromotryptophane
5-chloro-6-methyltryptophane
6-methyltryptophane
6-fluorotryptophane
6-ethyltryptophane
5,6-dichlorotryptophane
5-fluoro-6-methyltryptophane
5-chloro6-bromotryptophane
5-methyl-6-chlorotryptophane, sodium salt
5-fluoro-6-chlorotryptophane
5,6-dimethyltryptophane
5-bromo-6-methyltryptophane
5-methyl-6-bromotryptophane
5-bromo-6-chlorotryptophane
6-chlorotryptophane, sodium salt
5,6-dichlorotryptophane, sodium salt
6-chlorotryptophane, potassium salt
5,6-dibromotryptophane
6-(trifluoromethyl)tryptophane, ammonium salt
6-n-propyltryptophane
5,6-dimethyltryptophane, sodium salt
6-isopropyltryptophane
5,6-dichlorotryptophane hydrochloride
6-n-propyltryptophane
5,6-dimethyltrytophane nitrate
6-methoxytryptophane
5-methoxy-6-chlorotryptophane
6-ethoxytryptophane
6-isopropoxytryptophane
6-n-butoxytryptophane
5,6-difluorotryptophane
5,6-dimethoxytryptophane
6-turt-butyltryptophane
5-methyl-b 6-fluorotryptophane
6-chlorotryptophane citrate
5-fluoro-6-bromotryptophane
6-chlorotryptophane hydrochloride
5-bromo-6-fluorotryptophane
6-bromotryptophane hydroidide
5,6-dimethyltryptophane hydrochloride
5-chloro-6-fluorotryptophane Mixtures of two or more compounds can also be employed. Any given compund can be employed either as the d-enantiomorph or as a mixture of the d- and l-enantiomorphs.

In one aspect, the present invention is directed to a method of sweetening an orally acceptable substance which method comprises the step of adding to the substance a sweetening agent which is the d-enantiomorph of a substituted tryptophane compound of the formula:

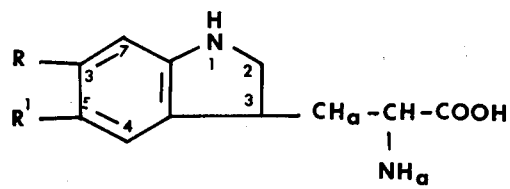

or its non-toxic physiologically acceptable salts, wherein R represents halo of an atomic weight of less than 85, lower alkyl, lower alkoxy, or trifluoromethyl; and R being trifluoromethyl, R' represents hydrogen, or R being halo as defined, lower alkyl, or lower alkoxy, R' represents hydrogen, halo of an atomic weight of less than 85, lower alkyl, or lower alkoxy. In a second aspect, the present invention is directed to a method which comprises administering essentially simultaneously to a warm-blooded animal an orally acceptable substance and an effective amount of a sweetening agent which is the d-enantiomorph of the substituted tryptophane compound of the formula set forth above. In yet another aspect, the present invention is directed to a composition comprising a preferred orally acceptable substance, a flavoring agent, and an effective amount of a sweetening agent which is the d-enantiomorph of the substituted tryptophane compound as above defined.

The identity of the orally acceptable substance in accordance with the present invention is not critical. In general, the term "orally acceptable substance" is employed herein to designate any substance which is taken partially or totally into the mouth cavity and which in this context is without any direct substantial toxicity. The substance can be one which is retained in or on the mouth only temporarily, such as, for example, chewing gum, toothpaste, lip cosmetics, mouthwash, mouthspray, substances used in dentistry for cleansing of teeth, denture treating substances, chewing tobacco and other tobacco products, or the like. Pet toys, for example, rubber dog bones, as well as other mechanical devices temporarily retained within the mouth, are also orally acceptable substances in accordance with the present invention. Similarly, glues and adhesives, as for use on stamps and evelopes, are orally acceptable substances in accordance with the present invention. Alternately, the orally acceptable substance can be one which is not only taken into the mouth cavity, but which, with or without mastication, is swallowed.

While the orally acceptable substance in accordance with the present invention can be any of a broad scope, as set forth above, including mechanical structures, a preferred orally acceptable substance is one which is a flavoring agent. The flavoring agent can be one which is contained in, as an inherent part of, a natural food; or the flavoring agent can be one specifically added to a substance, as, for example, a flavoring agent added to a chewing gum. This dual usage of the term "flavoring agent" as identifying either a food, or a substance added to a food, is in accordance with the terminology of this art (see Kirk-Othmer Encyclopedia of Chemical Technology, 2nd Edition, Interscience Publishers, Division of John Wiley & Sons, Inc., New York, 1966, Volume 9, page 347 and following).

There are, or course, numerous orally acceptable substances wherein the sole or main ingredient, other than inert substances such as water, thickening agents, and the like, is a flavoring agent. Attention is directed to coffee and tea. Thus, in accordance with the present invention, coffee, tea, fruit ades, or similar non-nutritive liquids of which the essential characteristic is a flavoring agent, can be sweetened with the present active agent. Furthermore, there are non-nutritive solid or semi-solid compositions such as salad dressings of which a main and essential constituent is a flavoring agent. Such compositions can be sweetened with the present active agent. The active agent can also be added to carbonated beverages of which a primary ingredient, or sole ingredient other than carbonated water, is a flavoring agent. In this sense, "flavoring agent" is used to describe a substance which has a discernible and desirable flavor at a concentration in liquids of 250 ppm or less, even though in other specialized applications, such as chewing gum, and highly flavored baked goods, higher concentrations may be used.

Representative such flavoring agents include spices and herbs; the essential oils and their extracts; fruit-derived flavorings; plant extracts, as, for example, cola, caffeine, etc.; and synthetic flavorings, including those which simulate or duplicate the effective components of the flavoring agents of the previous categories. Attention is directed to Food Technology, 19, part 2, page 155 (1965), which lists substances generally recognized as safe for food additive purposes, including flavoring agents as well as other food additives which serve as bulking agents, etc.

The flavoring agent with which the present sweetening agent is combined can also be a nutritive component of a food. In this sense, then, the present invention is directed to formulations comprising the present sweetening agent, plus a food comprising as an inherent part thereof a flavoring agent.

Thus, for example, the food can be a nutritive solid. Such nutritive solid can be any of a great variety of foods, including baked goods such as bread, crackers, pretzels, pastries, or cake; cereal products; milk derived products, such as ice cream, ice milk, sherberts, custards and other puddings; jello and gelatin products; and processed vegetables and fruits, such as, for example, canned tomatoes, frozen vegetables, and the like. Such nutritive solid foods include meat products in which a sweetening substance is incorporated during processing, such as ham and bacon. The nutritive solid in accordance with this invention also comprehends prepared "mixes" such as mixes for puddings, cakes, pastries, and the like; and confectionary products, for example popcorn, peanut candies, chocolate candies, jellybeans, gumdrops, candy cigarettes, taffy, licorice, and the like. Furthermore, in accordance with the present invention, the term nutritive solid is inclusive of natural sugar and glycine and other amino acids which are nutritive. The nutritive solid can also be a feed, such as a grain-type feed silage, or other feed, for lower warm-blooded animals. The present active agent can also be added to specialized types of lower, warm-blooded animal feeds, such as salt licks, and can be used in baits as an attractant. In the instance of domestic animals such as dogs, the active agent can be added to regular feeds or to pet snack-type foods.

The food which comprises the flavoring agent can also be a nutritive liquid. Representative nutritive liquids include fruit and vegetable juices; alcoholic beverages such as beer, wine, cocktails and cocktail mixes, milk beverages such as milkshakes, "nogs," and the like; and where nutritive in character, carbonated beverages containing flavorings.

The present active agent can also be combined with a medicinal substance as an orally acceptable substance. Such medicinal substances can be a solid, such as a tablet, capsule, powder, or lozenge, including cough drops. The medicinal substance can also be a liquid; for example, an elixir, syrup, suspension, and the like. In this sense, "medicinal substance" is inclusive of veterinary substances for lower, warm-blooded animals.

The method of administration is not critical. The present non-nutritive agent is conveniently formulated as a tablet or capsule, and in this form, is especially suited for use with liquid substances. Thus, for example, the desired benefits of the present invention are obtained by adding a tablet of appropriate amount to a liquid, such as, for example, coffee. Such addition can be done on an individualized per-cup or per-glass basis. The present non-nutritive agent is equally well adapted to be formulated as a liquid formulation, typically an aqueous formulation, a suitable amount of which can be added to a solid or liquid food, and mixed therewith prior to consumption. In addition, the present non-nutritive sweetener is conveniently prepared as a free-flowing powder, which can then be shaken over and if desired mixed into an orally acceptable substance. It is, of course, also possible to incorporate the present active agent in pre-prepared mixes such as cake mixes, pudding mixes and the like, for home and/or industrial food preparation usage. Furthermore, the present non-nutritive sweetener can be employed in the processing of substances which are orally acceptable initially or after processing; as examples, ham and tobacco products are mentioned.

In order that the present active agent give the desired sweetening effect to the orally acceptable substance, it is necessary that the non-nutritive sweetener be taken into the mouth cavity at essentially the same time as the orally acceptable substance is taken into the mouth cavity. It is preferred that the substance and the sweetening agent be mixed before being taken into the mouth, but this is not critical.

The amount of the present non-nutritive sweetener to be employed is not critical either, it being necessary only that an effective amount is used. Generally, an effective amount is that amount which provides a sense of sweetness comparable to that afforde by sucrose at a given usage rate. Sucrose, of course, is used in a very wide range of concentrations in various orally acceptable substances. Thus, for example, in confectionary products sucrose concentration may approach 100 percent, whereas in many common foods and liquids, the sucrose concentration may be as low as 1 percent or lower, even so low as to be negligible. Correspondingly, the amount of the present active agent which will provide sweetness equivalent to that afforded by sucrose also varies widely. The amount of the present active agent to be used will also depend upon such variables as the particular animal and purpose of sweetening and other factors. For sucrose concentrations of from about 6.5 percent to 45 percent, concentrations including most food and even many confectionary applications, the present active agent, when substituted for sucrose, gives approximately equivalent sweetness at concentrations of from about 0.05 to 30 percent, as the racemic mixture. Where the d-enantiomorph is employed alone, these rates can be reduced by a factor of about one-half. Higher or lower concentrations of the active agent of the present invention can be used where the degree of sweetness, by a sucrose standard, is greater or lesser. However, usage of a high concentration of any non-nutritive sweetener generally increases the incidence of off-flavor and other undesirable side effects; for this reason, where a high degree of sweetness is desired, it is generally preferred to use a combination of the present active agent with one or more other known non-nutritive sweeteners, as is discussed further hereinbelow.

It is noted that the sweetening effect of the present active agent is exhibited well below the rates at which any toxic effect can be detected. In an initial evaluation, dl-6-chlorotryptophane was administered orally to a group of mice at the rate of 2 grams of compound per kilogram of individual animal body weight. No toxic symptoms of any type were noted. The same results were obtained where the compound being evaluated was dl-6-methyltryptophane and where the compound being evaluated was dl-6-fluorotryptophane.

The compounds serving as the present active agent can be employed as sole agent; or, alternately, such compound or compounds can be employed jointly with other known non-nutritive sweeteners. In particular, one or more compounds serving as active agent in accordance with the present invention can be combined with a saccharin-type sweetener; with a cyclamate-type sweetener; with a dihydrochalcone-type sweetener; or with 5-(3-hydroxyphenoxy)-1H-tetrazole.

Saccharin has the following structure:

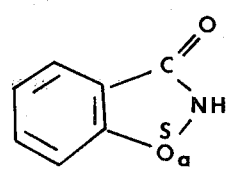

but ring-substituted saccharin derivatives:

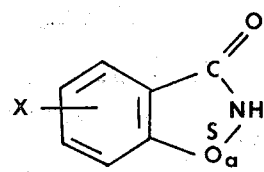

wherein X is, for example, methyl, fluoro, chloro, bromo, amino, or sulfamoyl, are also sweet. In addition, the compounds retain sweetness when employed in the form of a salt. Therefore, as employed in the present specification and claims, the term "saccharintype sweetner" means a compound having the essential structure described above and includes non-toxic physiologically acceptable salts thereof. Generally, the sodium or calcium salt is used.

Cyclohexylsulfamic acid (cyclamic acid) has the following structure:

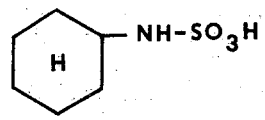

but, as in the inatance of saccharin, ring-substituted derivatives are also sweet, and salt formation does not destroy the sweet taste. Therefore, as used in the present specification and claims, the term "cyclamate-type sweetner" means a compound having the essential structure of cyclamic acid, and includes non-toxic physiologically acceptable salts thereof. Generally, the sodium or calcium salt is employed, although the magnesium salt has also been used for some purposes.

5-(3-Hydroxyphenoxy)-1H-tetrazole has the following structure:

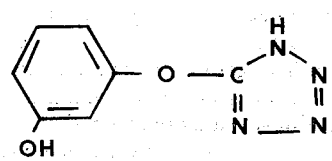

but can equally, in accordance with the present invention, be employed as one of its non-toxic physiologically acceptable salts. Suitable salts include the sodium, calcium potassium and ammonium salts.

The dihydrochalcone-type sweeteners include those of the genus disclosed and claimed in U.S. Pat. No. 3,087,821:

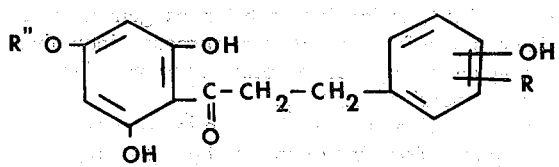

wherein R' represents a radical selected from the group consisting of hydrogen, hydroxy, and methoxy, and R" represents a radical selected from the group consisting of glucosyl and neohesperidosyl. As noted in this patent, neohesperidin dihydrochalcone is a preferred member of this class. However, a publication by Krbechecks et al. (J. Ag. & Food Chem., Vol. 16 No. 1, page 108 [1968]) on this genus discloses other related compounds, notably higher alkoxy substituted compounds, which are even more sweet. Such related compounds are also dihydrochalcons-type sweeteners in accordance with the present invention and can be employed jointly with the active agent of the present invention.

When the active agent in accordance with the present invention is used in conjunction with another non-nutritive sweetener, the exact ratio of the components is not critical and can vary considerably, depending upon the identity of the animal, the type of orally acceptable substance, and the like. A synergistic effect is often noted when non-nutritive sweetening substances are combined. Thus, for example, when sodium saccharin is employed alone a concentration of 0.1 percent by weight is necessary to obtain a desirable sweet taste; and sodium cyclamate alone requires a concentration of 0.25 percent by weight. Yet combined, the same level of sweetness is obtained at a concentration of 0.01 percent of sodium saccharin and 0.1 percent of sodium cyclamate, both concentrations by weight (see U.S. Pat. No. 2,803,551).

Representative rates for the present active agent, when employed alone, are set forth hereinabove. When the active agent is combined with a saccharin-type sweetener; with a cyclamate-type sweetener; with a dihydrochalcone-type sweetener; or with 5-(3-hydroxyphenoxy)-1H-tetrazole, the resulting combination is synergistic throughout much of the possible ratio of combinations, and lesser amounts of the substances can be employed than otherwise. It is, of course, not necessary that combinations be employed only in a ratio that is synergistic, any combination being useful for the purposes of the present invention. However, due to the fact that lesser amounts of non-nutritive sweetening agents decrease the likelihood of aftertaste, as well as the likelihood of side effects, such synergistic ratios of mixtures are an especially preferred embodiment of the present invention. Economic considerations also favor the use of as little active agent as possible. Thus, for example, in combination with a saccharin-type sweetener, synergistic effects are obtained when combining the substances in a ratio ranging from 300 parts of present active agent to 1 part of saccharin type sweetener, to 1 part of present active agent to 300 parts of saccharin-type sweetener by weight. A generally preferred range of synergistic combination is that of a ratio ranging from 1:50 to 50:1, by weight.

Similarly, in the combination of the present active agent with 5-(3-hydroxyphenoxy)-1H-tetrazole, synergistic results are obtained at a ratio ranging from 1 part of present active agent to 300 parts of the 5-(3-hydroxyphenoxy)-1H-tetrazole by weight to 1 part of the 5-(3-hydroxyphenoxy)-1H-tetrazole to 300 parts of the present active agent; a particularly preferred ratio of combination is a ratio of from 1:50 to 50:1, by weight.

In the instance of the dihydrochalcone-type of sweetener, synergism is likewise noted throughout most of the range, such as a ratio ranging from 1 part of the present active agent to 30 parts of the dihydrochalcone-type sweetener, by weight, to a ratio of 1 part of the dihydrochalcone-type sweetener to 30 parts of the present active agent, by weight. A preferred ratio is from 1:5 to 5:1 by weight.

Synergism with a cyclamate-type sweetener is noted in a ratio ranging from 1 part of cyclamate-type sweetener to 320 parts of the present active agent, by weight, to 1 part of the present active agent to 320 parts of the cyclamate-type sweetener, by weight. A preferred ratio ranges from 1:60 to 60:1, by weight.

It is known that the use of saccharin as a sweetening agent is accompanied by bitter aftertaste, experienced by a certain portion of the population. Since for many applications, the substance is ideally suited to usage as a sweetener, methods of diminishing the aftertaste have been studied. Attention is directed to British Pat. No. 1,091,154 and to U.S. Pat. No. 3,329,508 as examples. Therefore, in those unusual situations wherein the active agent in accordance with the present invention is accompanied by aftertaste, known methods of diminishing such aftertaste can be utilized. Furthermore, such methods can also be used where the present active agent is combined with saccharin and/or other non-nutritive sweeteners.

It is also possible to combine the present active agent with sucrose or other nutritive sweeteners so as to obtain a sweetening substance of reduced caloric value. Such a mixture of nutritive sweetener and the present active agent can be formulated as a foam or the like, in accordance with procedures known in the prior art for a combination of sucrose and sodium saccharin. Such manner of formulating results is a composition having both volume and sweetening effect equivalent to sucrose, alone, but with reduced caloric value.

The following examples illustrate the present invention and will enable those skilled in the art to practice the same.

EXAMPLE 1

An initial series of evaluations was carried out, each in essentially identical procedures. Each evaluation comprised the tasting of a small amount of the given compound, such amount being that which would adhere to a fingertip. Compounds so evaluated were rated for degree of sweetness, and aftertaste, if any. The sweetness ratings were as follows:

TABLE I

| Compound Evaluated | Sweetness Rating |
| --- | --- |
| dl-6-(trifluoromethyl)tryptophane | very sweet |
| dl-6-bromotryptophane | sweet |
| dl-6-methyltryptophane | very sweet |
| dl-6-chlorotryptophane | very sweet |
| dl-6-chlorotryptophane hydrochloride | very sweet |
| dl-6-fluorotryptophane | very sweet |
| dl-5,6-dimethyltryptophane | sweet |
| dl-5,6-dichlorotryptophane | very sweet |
| dl-6-isopropyltryptophane hydrochloride | sweet |
| dl-6-methoxytryptophane | sweet |
| dl-6-chlorotryptophane, sodium salt | very sweet |

No aftertaste was observed with any of the compounds evaluated.

EXAMPLE 2

In another series of evaluations, certain of the compounds to be employed as active agent in accordance with the present invention were tested for their sweetening effect in aqueous solutions. The evaluation enabled comparison with known sweetening agents.

In this series of evaluations, each compound was separately dissolved in each of several portions of water, thus obtaining several concentrated solutions of the respective compound. In addition, an aqueous solution containing 8 percent sodium cyclamate and 0.8 percent of saccharin was prepared.

In the evaluation, each of the solutions of the compound being evaluated, as well as the solution of the saccharin and sodium cyclamate, was diluted at the rate of 1 part per 80 parts of water. In the instance of the saccharin and sodium cyclamate solution, dilution afforded a concentration of 0.10 percent sodium cyclamate and 0.01 percent saccharin, this concentration being equivalent in sweetness to a 10 percent solution of sucrose. In the instance of the solutions of the present active compounds, concentration of the compound therein varied among the solutions. All solutions were of a pH of 6.7.

Thereafter, all solutions were taste tested by a panel of five persons. Comparison was made between the saccharin/sodium cyclamate solution serving as a standard, and equivalent to a 10 percent solution of sucrose, and the various solutions of the present active agent. These solutions adjudged to be equivalent to the control solution were as listed in the following table.

TABLE II

| Compound Evaluated | Concentration of Test Solution of Sweetness Comparable to That of Control |
|---|---|
| dl-6-fluorotryptophane | 0.125 percent |
| dl-6-methyltryptophane | 0.075 percent |
| dl-6-chlorotryptophane | 0.075 percent |

No bitterness was observed in any of the solutions tested, although a slight off-flavor was noted in the instance of the 6-fluorotryptophane.

EXAMPLE 3

Various of the compounds serving as the present active agent were evaluated further, jointly with saccharin. In this evaluation, aqueous solutions were prepared containing saccharin and one of the selected compounds. The concentration of the saccharin and of the selected compound was varied inversely among the solutions. In addition, as in Example 2, an aqueous solution containing 8 percent of sodium cyclamate and 0.8 percent of sodium saccharin was diluted at the rate of 1 part per 80 parts of water, thus affording a standard equivalent to a 10 percent sucrose solution. All solutions were at a pH of 6.7. As in the evaluation reported in Example 2, the solutions containing the test compounds were taste tested. Taste was compared with the standard to determine which concentration of test compound and saccharin was equivalent to the standard. Solutions judged to be equivalent to the standard are listed in the following table.

TABLE III

| | Ingredients and Concentrations of Solutions Thereof Equivalent to Standard | |
|---|---|---|
| Evaluation I (by panel of five persons) | Percent of dl-6-chlorotryptophane | Percent of Sodium Saccharin |
| | 0. | >0.1 |
| | 0.003125 | 0.0125 |
| | 0.0055 | 0.01 |
| | 0.0095 | 0.005 |
| | 0.0125 | 0.0025 |
| | 0.075 | 0. |
| Evaluation II (by panel of five persons) | Percent of dl-6-methyltryptophane | Percent of Sodium Saccharin |
| | 0. | >0.1 |
| | 0.1 | 0.0125 |
| | 0.014 | 0.01 |
| | 0.01875 | 0.00625 |
| | 0.075 | 0. |
| Evaluation III (by one person) | Percent of dl-6-trifluoromethyltryptophane | Percent of Sodium Saccharin |
| | 0. | >0.1 |
| | 0.006 | 0.0125 |
| | 0.075 | 0. |
| Evaluation IV (by one person) | Percent of dl-5,6-dichlorotryptophane | Percent of Sodium Saccharin |
| | 0. | >0.1 |
| | 0.004 | 0.0125 |
| | 0.075 | 0. |
| Evaluation V (by one person) | Percent of dl-6-methoxytryptophane | Percent of Sodium Saccharin |
| | 0. | >0.1 |
| | 0.0125 | 0.015 |
| | 0.01 | 0.020 |
| | 0. | 0.1 |

EXAMPLE 4 dl-6-Chlorotryptophane was evaluated further by a panel of five persons, in accordance with the procedures of Example 3 except that the solutions were at a pH of 3.25. The results were as set forth in the following table:

TABLE IV

| Ingredients and Concentrations of Solutions Thereof Equivalent to Standard | |
|---|---|
| Percent of dl-6-chlorotryptophane | Percent of Sodium Saccharin |
| 0. | >0.1 |
| 0.01 | 0.01 |
| 0.1 | 0. |

EXAMPLE 5 dl-6-Chlorotryptophane was evaluated further by a panel of five persons, in accordance with the procedures of Example 3 except that carbonated water was used, and that a prepared cola syrup consisting of extract of kola nuts and other natural flavors, phosphoric acid, caffeine, and water, caramel colored, was added. The resulting solution simulated a typical carbonated cola-type soft drink. Due to the specialized nature of such a beverage, the standard use was a solution containing 0.0125 percent of sodium saccharin and 0.125 percent of sodium cyclamate. The comparative results are presented below:

TABLE V

Ingredients and Concentrations of Solutions Thereof Equivalent to Standard

| Percent of dl-6-chlorotryptophane | Percent of Sodium Saccharin |
| --- | --- |
| 0. | >0.1 |
| 0.0125 | 0.0125 |
| 0.1 | 0. |

EXAMPLE 6 dl-6-Chlorotryptophane was also evaluated in combination with the sodium salt of 5-(3-hydroxyphenoxy)-1H-tetrazole. The evaluation was carried out in accordance with the evaluation reported in the preceding examples, with a taste panel of five persons. Results were as set forth in the following table:

TABLE VI

Ingredients and Concentrations of Solutions Thereof Equivalent to Standard

| Percent of dl-6-chloro-tryptophane | Percent of Sodium Salt of 5-(3-hydroxyphenoxy)-1H-tetrazole |
| --- | --- |
| 0. | 0.075 |
| 0.0025 | 0.01625 |
| 0.004 | 0.0125 |
| 0.00625 | 0.01 |
| 0.008 | 0.008 |
| 0.075 | 0. |

EXAMPLE 7 dl-6-Chlorotryptophane was additionally evaluated in combination with neohesperidin dihydrochalcone, in the manner as the evaluation reported in Example 6. The results were as follows:

TABLE VII

Ingredients and Concentrations of Solutions Thereof Equivalent to Standard

| Percent of dl-6-Chloro-tryptophane | Percent of Neohesperidin dihydrochalcone |
| --- | --- |
| 0.075 | 0. |
| 0.004 | 0.004 |
| 0. | >0.05 |

EXAMPLE 8

In further operations, dl-6-chlorotryptophane was evaluated in a carbonated beverage; the compound was dissolved at different concentrations in a number of solutions, each having the following composition:

| sodium citrate | 0.025 | percent |
| citric acid | 0.22 | percent |
| alcoholic lemon-lime extract | 0.125 | percent |
| sodium saccharin | 0.01 | percent | the remainder being carbonated water. The various solutions were judged by a taste panel of five persons to determine which was comparable, in sweetness, to a standard solution. The standard solution contained sodium citrate, citric acid, and alcoholic lemon-lime extract in the same concentrations as above, but contained 0.1 percent of sodium cyclamate and 0.01 percent of sodium saccharin. This standard solution, therefore, was approximately equivalent to a commercially available carbonated beverage of this type sweetened with a known non-nutritive sweetener. The mixture containing the dl-6-chlorotryptophane in a concentration of 0.0125 percent was judged to be equivalent in sweetness to the standard. No off-flavor was noted in any of the solutions containing dl-6-chlorotryptophane.

EXAMPLE 9

In other operations, dl-6-chlorotryptophane was evaluated in hot cocoa. In these operations, the compound was dissolved in a number of mixtures, at varying concentrations; each such mixture comprised 1 cup of milk, a tablespoon of commercially available cocoa powder, 0.02 percent of sodium saccharin, and the dl-6-chlorotryptophane in a given amount. Each such mixture was heated to the boiling temperature and then permitted to cool somewhat. All mixtures were evaluated by a taste panel of five persons, to determine which of the mixtures afforded a degree of sweetness comparable to another mixture prepared as described but containing 1 cup of milk, 1 tablespoon of the same commercially prepared cocoa powder, and 0.2 percent of sodium cyclamate and 0.02 percent of sodium saccharin. The consensus of the taste panel was that the mixture containing 0.0125 percent of the dl-6-chlorotryptophane afforded a sense of sweetness comparable to that of the standard control solution. No off-flavor was noted in any of the cocoa mixtures containing the dl-6-chlorotryptophane.

EXAMPLE 10

In another evaluation, dl-6-chlorotryptophane was evaluated in a vanilla-flavored dessert sauce. In the evaluation, the compound was dissolved in various mixtures, each such mixture comprising the following ingredients:

1 cup milk
1 tablespoon of cornstarch
⅛ teaspoon of salt
sodium saccharin, in a concentration of 0.08 percent
dl-6-chlorotryptophane in a given amount The concentration of the dl-6-chlorotryptophane was varied among the several mixtures. Each such mixture was then cooked until gelatinized, and thereafter cooled and 2 tablespoons of butter and ¼ teaspoon of vanilla added to each mixture. Another such mixture was prepared as a standard, as above, except that in place of the sodium saccharin and dl-6-chlorotryptophane, there was supplied sodium cyclamate in a concentration of 0.4 percent, and sodium saccharin in a concentration of 0.04 percent. A taste panel of five persons then evaluated the various dessert sauces; the consensus of the panel was that the sauce containing 0.08 percent of sodium saccharin and 0.08 percent of dl-6-chlorotryptophane afforded a sense of sweetness approximately comparable to that of the standard. Some off-flavor was noted by some members of the taste panel in the sauces containing the dl-6-chlorotryptophane and sodium saccharin; this off-flavor was believed to be due to the sodium saccharin.

EXAMPLE 11

Another evaluation with dl-6-chlorotryptophane was made, in accordance with the procedures of Example 10 except that the sauce was made with water instead of milk and flavored with lemon juice (3 tablespoons per batch) instead of with vanilla as in Example 10. The taste panel judged as comparable to the standard that composition which contained 0.12 percent of sodium saccharin and 0.12 percent of dl-6-chlorotryptophane. As in Example 10, some members of the taste panel noted an off-flavor in some of the sauces containing the dl-6-chlorotryptophane and sodium saccharin; as above, this off-flavor was believed to be due to the sodium saccharin.

EXAMPLE 12

A liver flavored dog food comprising dl-6-chlorotryptophane is prepared. The preparation consists of the mixing and blending of
 meat and meat by-products, including liver,
 soy grits,
 dried whey,
 propylene glycol,
 animal fat preserved with butylated hydroxyanisole and butylated hydroxytoluene,
 dicalcium phosphate,
 iodized salt,
 dried yeast,
 potassium sorbate,
 garlic powder,
 artificial coloring,
 vitamin A and D oil,
 vitamin B supplement,
 vitamin E supplement,
as standard ingredients, and, in addition thereto, dl-6-chlorotryptophene, in an amount to provide 0.075 percent by weight of the ultimate dog food composition. The resulting mixture is compacted in standard procedures as small bite-size chuncks. This composition serves as a complete dog food which is attractive to dogs but without the caloric value of sucrose or other nutritive sweetener.

EXAMPLE 13

A dog treat composition is prepared comprising, as standard ingredients:
 wheat flour,
 corn meal,
 soybean meal,
 meat meal,
 wheat germ meal,
 poultry by-product meal,
 animal fat preserved with butylated hydroxyanisole,
 condensed fish solubles,
 dried skimmed milk,
 poultry fat stabilized with butylated hydroxyanisole,
 dried meat solubles,
 dried vegetable pomace,
 dehydrated cheese,
 animal liver and glandular meal,
 steamed bone meal,
 salt,
 leavening,
 titanium dioxide,
 vitamin A oil,
 irradiated yeast,
 certified food colors,
and, as non-nutritive sweeteners, dl-6-(trifluoromethyl)tryptophane in an amount to constitute 0.0175 percent by weight of the total composition, and sodium saccharin in an amount to constitute 0.05 percent by weight of the total composition. The ingredients are mixed together and compacted in the form of bone-shaped snacks which have enhanced palatability without enhanced caloric content.

EXAMPLE 14

In further operations, d-6-chlorotryptophane was evaluated for its sweetening activity in aqueous solutions as against a standard aqueous solution containing 0.1 percent of sodium cyclamate and .01 percent of sodium saccharin, both by weight. The pH of all solutions was 6.7. A solution containing 0.0035 percent of d-6-chlorotryptophane and 0.005 percent of sodium saccharin, both by weight, was judged by a panel of five persons to be equivalent in sweetness to the standard. No off-flavor was noted.

In an identical evaluation with dl-6-chlorotryptophane, 0.007 percent of the dl-6-chlorotryptophane was required in combination with the 0.005 percent of sodium saccharin, both by weight, to give a level of sweetness equivalent to that of the standard.

We claim:
1. The method which comprises orally administering essentially simultaneously to a warm-blooded animal in which it is desired to limit caloric uptake, said animal being selected from the group consisting of human being and dog
   1. an orally acceptable substance and
   2. a non-nutritive sweetener which is the d-enantiomorph of a substituted tryptophane compound of the formula

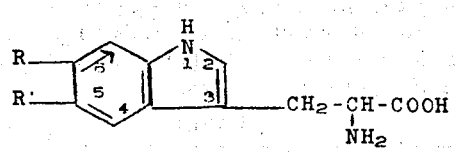

or its non-toxic physiologically acceptable salts, wherein R represents halo of an atomic weight of less than 85, lower alkyl, lower alkoxy, or trifluoromethyl; and when R is trifluoromethyl, R' represents hydrogen, or when R is halo as defined, lower alkyl, or lower alkoxy, R' represents hydrogen, halo of an atomic weight of less than 85, lower alkyl, or lower alkoxy, said non-nutritive sweetener being administered in an amount sufficient to impart a desired degree of sweetness to the orally acceptable substance.

2. The method of claim 1 wherein the substituted tryptophane compound is 6-chlorotryptophane.

3. The method of claim 1 wherein the substituted tryptophane compound is 6-(trifluoromethyl)tryptophane.

4. The method of claim 1 wherein the substituted tryptophane compound is 6-methyltryptophane.

5. The composition comprising
   1. a flavoring agent, said agent being a substance which has a discernible and desirable flavor at a concentration in liquids of 250 ppm or less, and
   2. a non-nutritive sweetener which is the d-enantiomorph of a substituted tryptophane compound of the formula

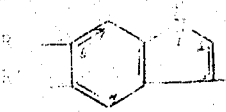

or its non-toxic physiologically acceptable salts, wherein R represents halo of an atomic weight of less than 85, lower alkyl, lower alkoxy, or trifluoromethyl; and when R is trifluoromethyl, R' represents hydrogen, or when R is halo as defined, lower alkyl, or lower alkoxy, R' represents hydrogen, halo of an atomic weight of less than 85, lower alkyl, or lower alkoxy, said non-nutritive sweetener being present in an amount sufficient to impart a desired degree of sweetness to the composition.

6. The composition of claim 5 wherein the substituted tryptophane compound is 6-chlorotryptophane.

7. The composition of claim 5 wherein the substituted tryptophane compound is 6-(trifluoromethyl)-tryptophane.

8. The composition of claim 5 wherein the substituted tryptophane compound is 6-methyltryptophane.

9. The composition of claim 5 wherein the flavoring agent is a nutritive solid.

10. The composition of claim 5 wherein the flavoring agent is a nutritive liquid.

11. The composition of claim 5 wherein the flavoring agent is at least essentially non-nutritive.

12. The composition of claim 5 which is a liquid composition.

13. The composition of claim 12 which is an essentially non-nutritive liquid composition.

14. The composition comprising (1) a medicinal substance and (2) an effective amount of a non-nutritive sweetener which is the d-enantiomorph of a substituted tryptophane compound of the formula

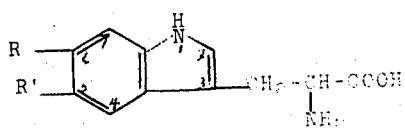

or its non-toxic physiologically acceptable salts, wherein R represents halo of an atomic weight of less than 85, lower alkyl, lower alkoxy, or trifluoromethyl; and when R is trifluoromethyl, R' represents hydrogen, or when R is halo as defined, lower alkyl, or lower alkoxy, R' represents hydrogen, halo of an atomic weight of less than 85, lower alkyl, or lower alkoxy, said non-nutritive sweetener being present in an amount sufficient to impart a desired degree of sweetness to the composition.

15. The composition comprising
   1. as a first substance, the d-enantiomorph of a substituted tryptophane compound of the formula

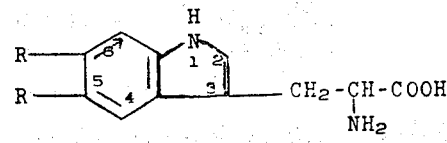

or its non-toxic physiologically acceptable salts, wherein R represents halo of an atomic weight of less than 85, lower alkyl, lower alkoxy, or trifluoromethyl; and when R is trifluoromethyl, R' represents hydrogen or when R is halo as defined, lower alkyl, or lower alkoxy, R' represents hydrogen, halo of an atomic weight of less than 85, lower alkyl, or lower alkoxy; and (2) a second substance selected from the group consisting of
   a. a saccharin-type sweetener,
   b. a cyclamate-type sweetener,
   c. a dihydrochalcone-type sweetener, or
   d. 5-(3-hydroxyphenoxy)[(p-hydroxyphenyl)]1H-tetrazole or a non-toxic physiologically acceptable salt thereof, said substances being present in amounts sufficient, in combination, to impart a desired degree of sweetness to the composition.

16. The composition of claim 15 wherein the second substance is a saccharin-type sweetener.

17. The composition of claim 16 wherein the first substance is 6-chlorotryptophane.

18. The composition of claim 16 wherein the first substance is 6-methyltryptophane.

19. The composition of claim 16 wherein the saccharintype sweetener is sodium saccharin.

20. The composition of claim 19 wherein the first substance is 6-chlorotryptophane.

21. The composition of claim 19 wherein the first substance is 6-methyltryptophane.

22. The composition of claim 15 comprising, in addition, as a third substance, a flavoring agent.

23. The composition of claim 22 wherein the first substance is 6-chlorotryptophane and the second substance is sodium saccharin.

24. The composition of claim 22 wherein the first substance is 6-methyltryptophane and the second substance is sodium saccharin.

25. The composition of claim 15 wherein the second substance is sodium saccharin.

26. The composition of claim 15 wherein the second substance is sodium cyclamate.

27. The method which comprises orally administering the composition of claim 5 to a warm-blooded animal in which it is desired to limit caloric uptake, said animal being selected from the group consisting of human being and dog.

28. The method of claim 1 wherein the substituted tryptophane compound is 6-chlorotryptophane.

29. The method of claim 27 wherein the substituted tryptophane compound is 6-methyltryptophane.

30. The composition comprising
   1. a flavoring agent which is a spice, herb, essential oil, extract of an essential oil, fruit-derived flavoring, plant extract, or synthetic flavoring, and
   2. a non-nutritive sweetener which is the d-enantiomorph of a substituted tryptophane compound of the formula

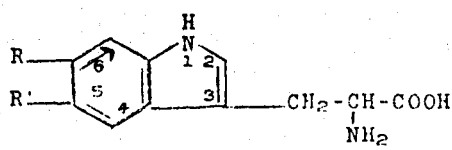

or its non-toxic physiologically acceptable salts, wherein R represents halo of an atomic weight of less than 85, lower alkyl, lower alkoxy, or trifluoromethyl; and when R is trifluoromethyl, R' represents hydrogen, or when R is halo as defined, lower alkyl, or lower alkoxy, R' represents hydrogen, halo of an atomic weight of less than 85, lower alkyl, or lower alkoxy, said non-nutritive sweetener being present in an amount sufficient to impart a desired degree of sweetness to the composition.

31. The composition of claim 30 wherein the flavoring agent is a fruit-derived flavoring.

32. The composition of claim 30 wherein the flavoring agent is a plant extract.

33. The composition of claim 32 wherein the plant extract is cola.

* * * * *

UNITED STATES PATENT AND TRADEMARK OFFICE
CERTIFICATE OF CORRECTION

PATENT NO. : 3,899,592
DATED : August 12, 1975
INVENTOR(S) : Tulio Suarez et al.

It is certified that error appears in the above-identified patent and that said Letters Patent are hereby corrected as shown below:

In column 1, about line 28, "sweeting" should be --sweetening--; about line 31, "ementi-" should be --enanti- --; and about lines 55-62 reprint the formula to read as follows.

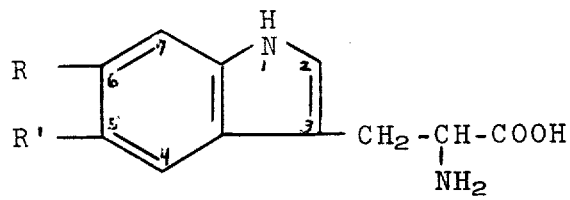

In column 2, about line 31, "sweeting" should be --sweetening--; and about line 48, add an -s- to "procedure".

In column 3, about line 34, delete the -e- from "rea-"; and about line 57, insert a hyphen between "chloro" and "6".

In column 4, about line 14, "turt" should be --tert--; about line 15, delete "b"; and about lines 32-40 reprint the formula to read as follows.

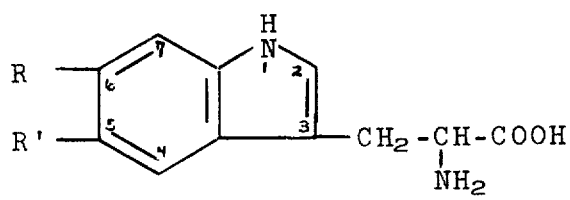

In column 5, about line 28, "or" should be --of--.

UNITED STATES PATENT AND TRADEMARK OFFICE
CERTIFICATE OF CORRECTION

PATENT NO. : 3,899,592
DATED : August 12, 1975
INVENTOR(S) : Tulio Suarez et al.

It is certified that error appears in the above-identified patent and that said Letters Patent are hereby corrected as shown below:

In column 7, in the formula at about line 69, "$O_a$" should be --$O_2$--.

In column 8, in the formula at about line 8, "$O_a$" should be --$O_2$--; about line 15, insert a hyphen between "saccharin" and "type"; about line 16, "sweetner" should be --sweetener--; about line 29, "inatance" should be --instance--; about line 34, "sweetner" should be --sweetener--; and about lines 55-62, in the right-hand portion of the formula, "R" should be --R'--.

In column 9, about line 5, "dihydrochalcons" should be --dihydrochalcone--.

In column 15, about line 45, "chlorotryptophene" should be --chlorotryptophane--; and about line 49, "chuncks" should be --chunks--.

In column 16, about lines 48-54, reprint the formula to read as follows.

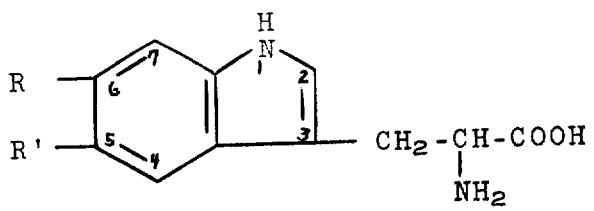

In column 17, about lines 13-18, reprint the formula to read as follows.

UNITED STATES PATENT AND TRADEMARK OFFICE
CERTIFICATE OF CORRECTION

PATENT NO. : 3,899,592

DATED : August 12, 1975

INVENTOR(S) : Tulio Suarez et al.

Page 3 of 3

It is certified that error appears in the above-identified patent and that said Letters Patent are hereby corrected as shown below:

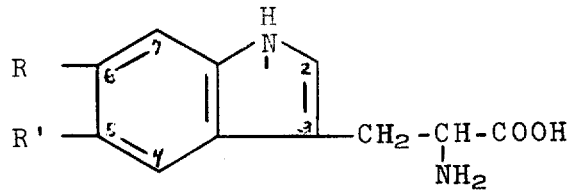

and about lines 46-67, delete Claim 14.

In column 18, about lines 4-8, reprint the formula to read as follows:

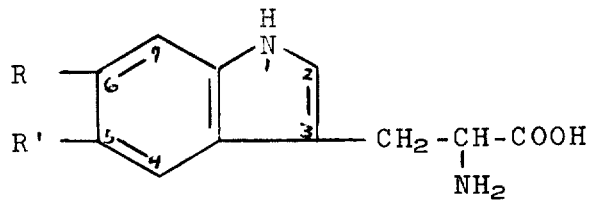

about line 23, delete "[(p-hydroxyphenyl)]" and insert a hyphen before "1H"; about line 35, insert a hyphen between "charin" and "type"; and in about line 58, cancel "1" and substitute --27--.

Signed and Sealed this seventeenth Day of February 1976

[SEAL]

Attest:

RUTH C. MASON
Attesting Officer

C. MARSHALL DANN
Commissioner of Patents and Trademarks